March 8, 1927.  1,620,000

E. R. BALL

SCOOP SCALE

Filed July 3, 1926

Inventor
Everett R. Ball
By Nissen & Crane attys.

Patented Mar. 8, 1927.

1,620,000

UNITED STATES PATENT OFFICE.

EVERETT R. BALL, OF QUINCY, ILLINOIS, ASSIGNOR OF ONE-HALF TO CHARLES E. MONCKTON, OF QUINCY, ILLINOIS.

SCOOP SCALE.

Application filed July 3, 1926. Serial No. 120,258.

This invention relates to a scoop such as is used by grocers and others for handling loose material, and has for its object the provision of such a scoop provided with a convenient weighing scale to determine the weight of the material in the scoop without the necessity of dumping the material from the scoop into a scale pan.

A further object is to provide a scoop of the kind mentioned which shall be of improved construction and operation.

The invention is exemplified in the combination and arrangement of parts shown in the accompanying drawing and described in the following specification, and it is more particularly pointed out in the appended claims.

In the drawing:—

Figure 1:
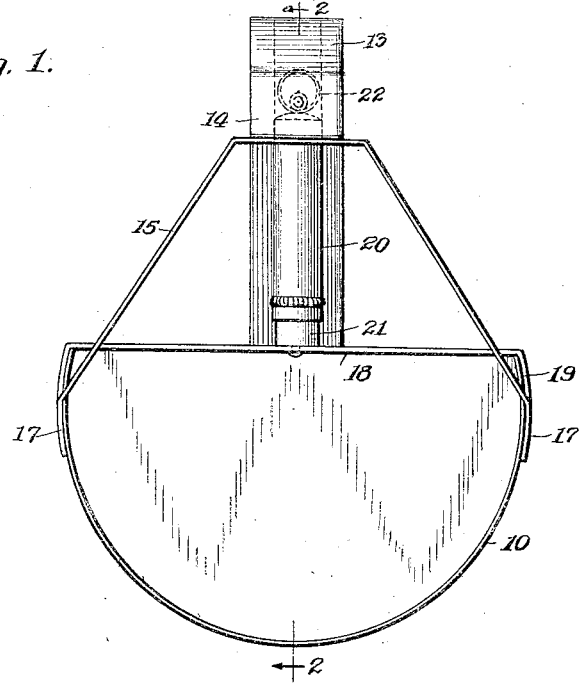
Fig. 1 is an elevation of one form of scoop embodying the present invention.
Figure 2:
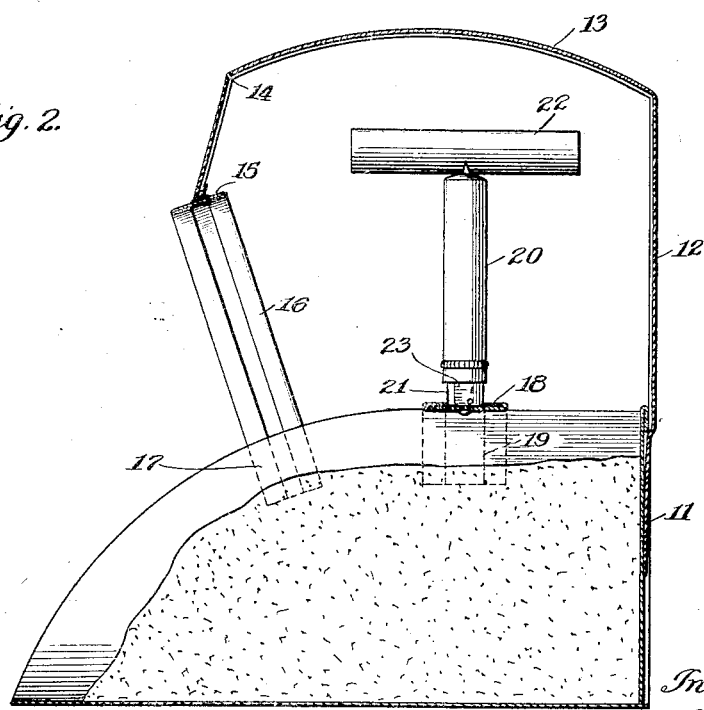
Fig. 2 is a vertical section on line 2—2 of Fig. 1.

The invention contemplates a scoop having a body portion 10 of any suitable form, the form illustrated in the drawing being rounded in cross section and having one end open and the other closed by a vertical wall 11. Extending upwardly from the wall 11 is a bar or strap 12 which is bent forwardly to form a handle portion 13. The strap is bent downwardly at 14 and attached to a cross bar 15 provided with laterally extending arms 16 which are secured to the side edges of the scoop 10 at 17. A second cross bar 18 extends across the top of the scoop in the rear of the cross bar 15 and is attached to the sides of the scoop at 19. The cross bar 18 is preferably spaced approximately over the center of gravity of the scoop when the scoop is filled. The parts of the scoop thus far described may be made of any suitable material such as aluminum, tinned sheet metal, copper or other suitable substance.

A weighing scale 20 is secured to the cross bar 18 midway between the ends of the cross bar. In the form of the invention illustrated, the scale 20 is provided with a telescoping plunger or piston 21 which is drawn into the outer casing of the scale by suitable spring balance mechanism disposed within the scale barrel. The piston 21 is rigidly fixed to the cross bar 18 to maintain the scale in an upright position beneath the handle 13. The scale is provided with a T-head or handle 22 disposed below the scoop handle 13 and extending in the same direction. The scale is provided with graduations 23 for indicating the weight of the material contained in the scoop. The graduations may be arranged to correct for the weight of the scoop itself so that the reading of the scale will show the weight of the material in the scoop and not require correction for the weight of the scoop.

In use, the operator grasps the handle 13 and scoops from the container the estimated quantity of material desired. To ascertain the weight of the material in the scoop, it is only necessary for the operator to extend his fingers so as to engage the handle 22 in place of the handle 13. The scoop is then suspended from the handle 22 and the graduations 23 will indicate the weight of the material in the scoop. If the weight is not exactly what is desired, it is a simple matter to discharge a sufficient quantity to give the proper weight or to scoop an additional quantity from the container to make up any shortage.

It will be understood that changes in the details of construction may be made by those skilled in the art without departing from the spirit and scope of the invention, as pointed out in the following claims.

I claim:—

1. A weighing scoop having a handle rigidly fixed to the scoop, and a scale having a supporting portion also rigidly fixed to the scoop and projecting upwardly therefrom, said scale having a handle carried thereby adjacent to and below the fixed handle on said scoop.

2. A weighing scoop comprising a body portion having one end open and the opposite end closed, a cross bar rigidly attached to said body portion between the ends thereof, a scale having a plunger rigidly fixed to said cross bar and extending upwardly therefrom, a portion slidable on said plunger and held thereby in upright position, and a handle attached to said last-named portion.

3. A weighing scoop comprising a body portion open at one end and having the opposite end thereof closed, a handle for said scoop comprising a support extending upwardly from the closed end of said scoop, a handle portion projecting forwardly from said upright portion, a yoke spanning the scoop adjacent the open end thereof, means for attaching said yoke to the forward end of said handle, a cross bar extending across the top of said scoop in a direction transverse to the direction of said handle, a scale having a plunger fixed to said cross bar below said handle and having a telescoping sleeve surrounding said plunger, and a scale handle extending in the direction of said scoop handle and attached to said sleeve and spaced downwardly from said scoop handle.

In testimony whereof I have signed my name to this specification on this 21st day of June, A. D. 1926.

EVERETT R. BALL.